INVENTOR.
EDWARD R. DAVIES
BY
Donnelly, Mentag + Harrington
ATTORNEYS

Oct. 22, 1963 E. R. DAVIES 3,107,765
TORQUE RESPONSIVE CLUTCH DISCONNECT MECHANISM
Filed Feb. 11, 1960 6 Sheets-Sheet 4

INVENTOR.
EDWARD R. DAVIES
BY
Donnelly, Mentag & Harrington
ATTORNEYS

Oct. 22, 1963  E. R. DAVIES  3,107,765
TORQUE RESPONSIVE CLUTCH DISCONNECT MECHANISM
Filed Feb. 11, 1960  6 Sheets-Sheet 5

INVENTOR.
EDWARD R. DAVIES
BY
Donnelly, Mentag & Harrington
ATTORNEYS

Oct. 22, 1963  E. R. DAVIES  3,107,765
TORQUE RESPONSIVE CLUTCH DISCONNECT MECHANISM
Filed Feb. 11, 1960  6 Sheets-Sheet 6

INVENTOR.
EDWARD R. DAVIES
BY
Donnelly, Mentag & Harrington
ATTORNEYS

United States Patent Office 3,107,765
Patented Oct. 22, 1963

3,107,765
TORQUE RESPONSIVE CLUTCH DISCONNECT
MECHANISM
Edward R. Davies, Bloomfield Hills, Mich., assignor to Jered Industries, Inc., Birmingham, Mich., a corporation of Michigan
Filed Feb. 11, 1960, Ser. No. 8,070
8 Claims. (Cl. 192—56)

My invention relates generally to fluid pressure operated clutches capable of transmitting driving torque in a driveline from a driving member to a driven member. More particularly, my invention relates to a new and improved automatic control circuit for regulating the operation of a fluid pressure operated clutch in a power installation wherein the clutch is capable of alternately interrupting and completing a power flow path between a power plant and a power absorbing means such as a ship screw or propeller.

Although the principles of my invention may be applied to a variety of mobile or stationary driveline installations, it is particularly adapted to be used in a multiple engine power plant for a marine vessel or for multiple engine power plants for wheeled vehicles. A preferred embodiment of my invention comprises a fluid pressure operated clutch which may be used in a multiple turbine power plant installation for a sea going vessel, one such clutch being used to form a driving connection between the power output shaft of each turbine engine and a geared power transmission mechanism, the latter including a power output gear member drivably connected to the screw of the ship. Each turbine is connected to a power input gear element of the power transmission mechanism through its associated clutch.

According to a principal feature of my invention I have provided an automatic control mechanism for each clutch which functions to engage automatically the clutch when the associated engine is capable of delivering a driving torque to the driven or power absorbing element, and which automatically disengages the clutch when the engine is malfunctioning or inoperative.

With such an installation it is possible to use any one engine or any combination of engines for power delivery purposes as desired. It is also possible to utilize simultaneously all of the engines and to subsequently shut down one or more of the engines if reduced power is desired. In this latter instance, the clutch associated with the inoperative engine will automatically disconnect the engine from the power delivery path. The inoperative engine therefore will not introduce frictional drag on the remaining operating engines.

The provision of an improved clutch and clutch control of the type above set forth being a principal object of my invention, it is a further object of my invention to provide a clutch system in a multiple engine driveline wherein a separate clutch forms a portion of the power delivery path of each engine and wherein an automatic, controlled engagement of the clutch for any given engine may be accomplished when that engine is conditioned for power delivery and accelerated to an operating speed equal to the speed of operation of the companion engines.

It is a further object of my invention to provide a control circuit for a multiple engine installation of the type above set forth wherein the fluid pressure used for control purposes is supplied by a pair of fluid pressure pumps, one pump being driven by a power output portion of the clutch structure and the other being driven by a power input portion thereof.

It is a further object of my invention to provide a driveline installation of the type above set forth wherein valve means are provided for eliminating excessive clutch drag or slippage during operation at low speeds when the oil pressure supplied to the control circuit is less than a desired minimum value.

For the purpose of particularly describing the principal features of a preferred embodiment of my invention, reference will be made to the accompanying drawings wherein:

FIG. 3 is a partial cross-sectional view of a portion of the clutch structure shown in FIGS. 1 and 2 and is taken along the plane of section line 3—3 of FIG. 1;

FIG. 6 is taken along the plane of section line 6—6 of FIG. 1;

FIG. 7 is taken along the plane of section line 7—7 of FIG. 1;

Figure 10:
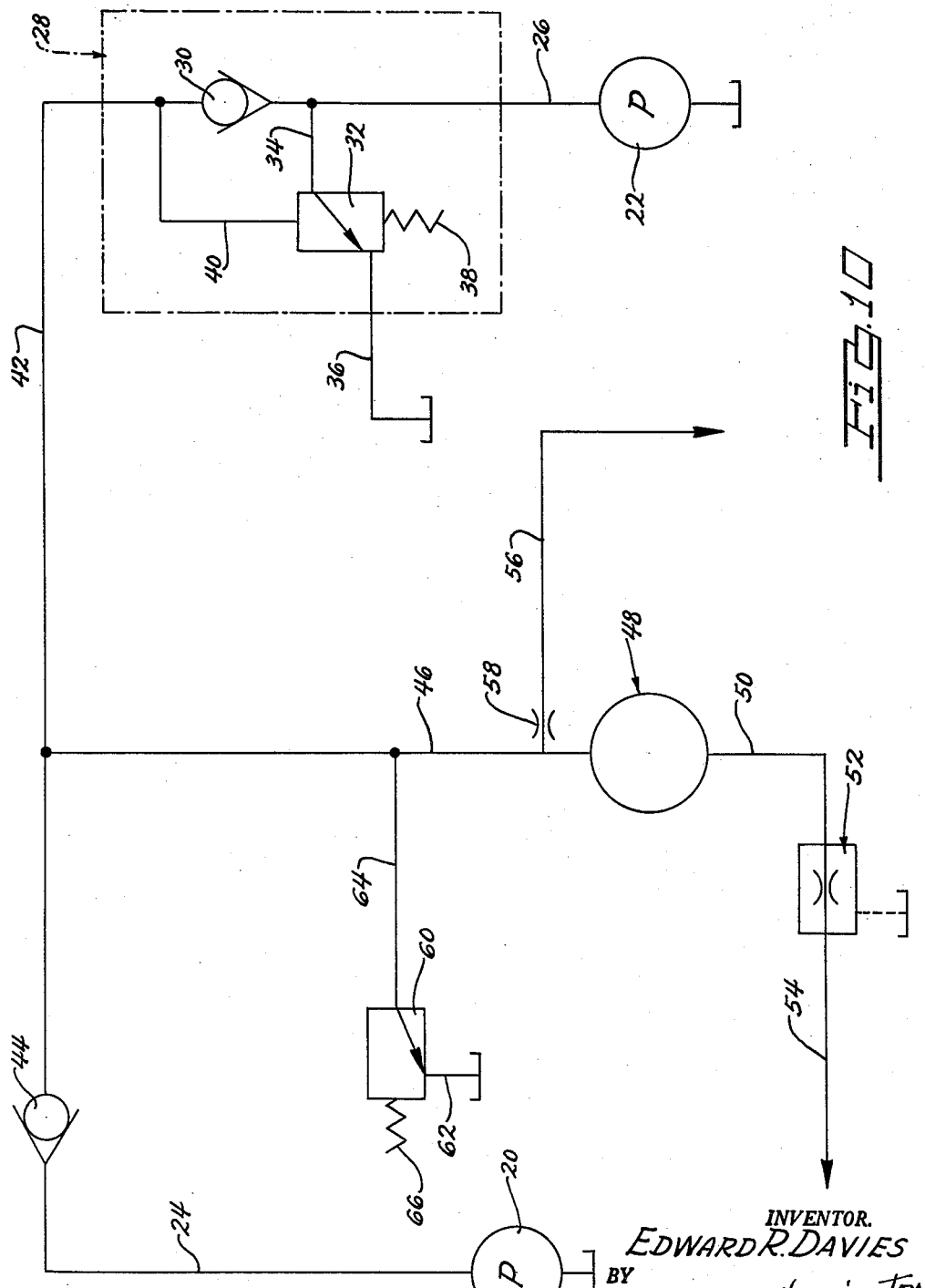
FIG. 10 is a schematic diagram showing the fluid pressure control circuit and the manner in which the various components of the circuit are inter-related.

Referring first to the circuit diagram of FIG. 10, the clutch mechanism includes two control pumps identified by reference characters 20 and 22, the pump 20 being drivably connected to power output portions of the clutch mechanism and the pump 22 being drivably connected to power input portions of the clutch mechanism. The discharge passage for pump 20 is shown at 24 and the discharge passage for pump 22 is shown at 26. A so-called pressure unloading relief valve is generally identified by reference character 28 and it includes a one-way check valve 30 situated in discharge passage 26 for pump 22. The unloading valve also includes the valve piston schematically illustrated at 32, and it functions to connect selectively a passage 34 extending from pump discharge passage 26 to an exhaust passage 36. The valve piston 32 is spring biased in one direction by valve spring 38 and in the opposite direction by an opposing fluid pressure force established by fluid pressure in branch passage 40 extending to a passage 42.

Discharge passage 24 for the pump 20 communicates with the aforementioned passage 42 through a one-way check valve 44, and the check valve 30 similarly provides communication between discharge passage 26 for pump 22 and passage 42. Passage 42 communicates with a passage 46 which extends to the input side of a torque sensitive valve generally identified by reference character 48. The output side of valve 48 is connected by means of a passage 50 to the input side of a flow control valve generally identified by reference character 52. The output side of the flow control valve 52 communicates with a passage 54 extending to the working chamber of the fluid pressure operated clutch.

A lubricating oil passage is shown at 56 and it includes a fluid flow restriction 58 which functions to maintain pressure in the circuit by reason of the pressure differential which exists thereacross when the pumps are operating.

A pressure relief valve is schematically illustrated at 60 and it includes a movable valve piston or spool capable of establishing communication between an exhaust passage and a passage 64 extending to passage 46. The valve piston is urged by a spring 66 into a passage closing position, and the valve is opened against the opposing spring force when a desired maximum pressure is obtained in the circuit. In a working embodiment of my invention this maximum pressure is established at 125 p.s.i.

The valve piston 32 of the unloading valve 28 functions to divert the delivery of pump 22 when the circuit pressure reaches a desired regulated value. According to a working embodiment of my invention this regulated value is 100 p.s.i.

The arrangement of the check valve shown at 30 and 44 makes it possible for either of the pumps 20 and 22 to supply the pressure requirements of the circuit. When the clutch is engaged and a steady state operating condition is established, the pump 22 supplies the control pressure and reverse flow into the pump 20 is prevented by valve 44. However, when the clutch is disengaged, the input driven pump 22 is inoperative and the pump 20 provides the lubricating oil pressure for the clutch mechanism, and valve 30 prevents reverse flow of this pressure into the region of pump 22.

The torque sensitive valve 48 interrupts communication between passages 46 and 50 when the power input portions of the clutch tend to rotate at a speed which is less than the speed of rotation of the power output portions. Conversely, the valve 48 functions to interconnect passages 46 and 50 when the speeds of rotation of the power input portions and the power output portions are equal. Flow control valve 52 is situated within the hub of the clutch structure and it prevents fluid pressure from reaching the clutch working chamber when the control pressure is less than 75 p.s.i. This low pressure condition might exist during the period of acceleration of the engine with which the clutch mechanism is used. During such operation the pumps are unable to satisfy the pressure requirements of the circuit. When the control pressure exceeds 75 p.s.i., the flow control valve assumes an open circuit condition thereby interconnecting passages 50 and 54 to effect clutch engagement. The valve 52 functions in this fashion to prevent excessive clutch drag at slow operating speeds.

Figure 1:
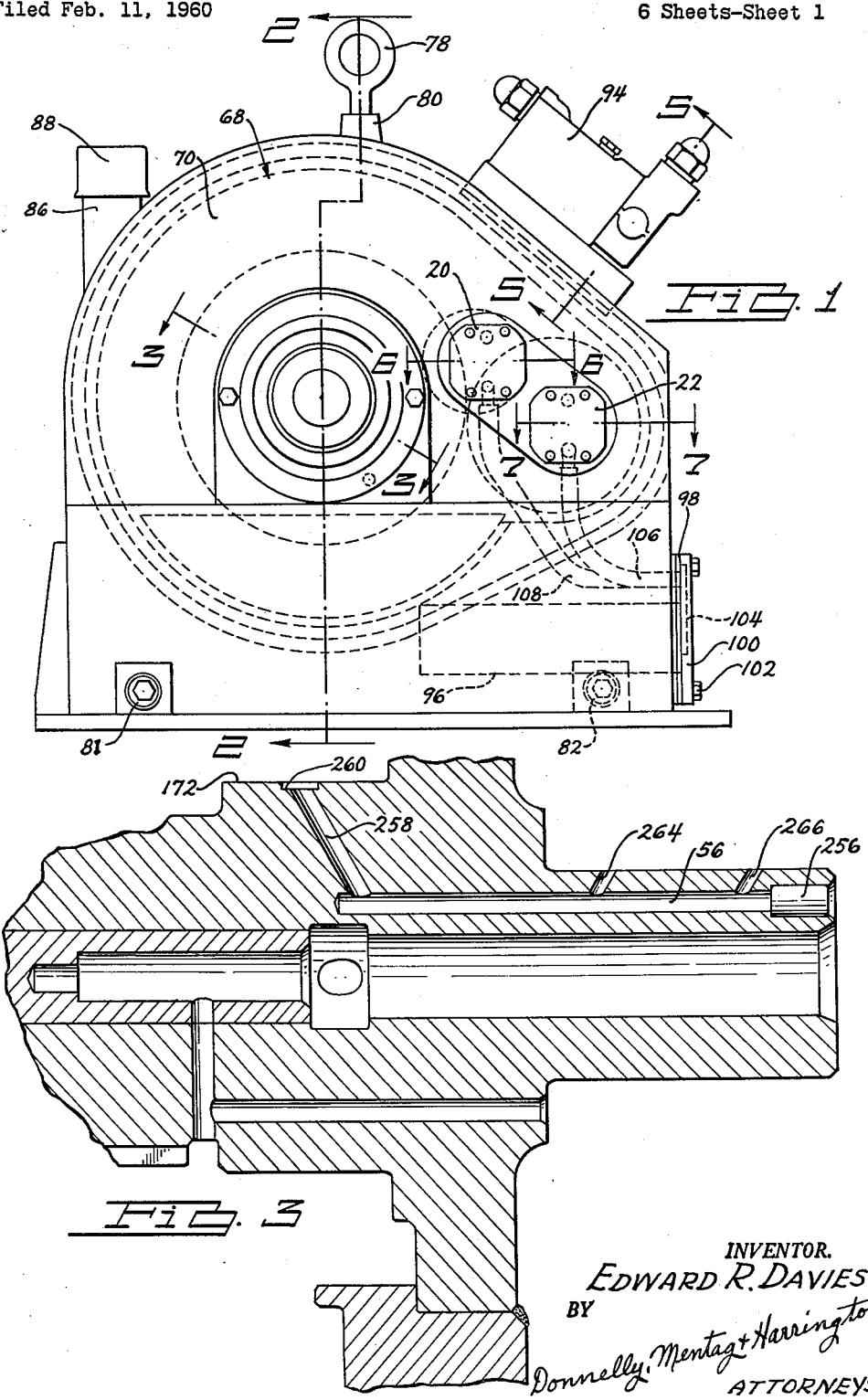
FIG. 1 shows an end elevation view of my improved clutch structure.
Figure 2:
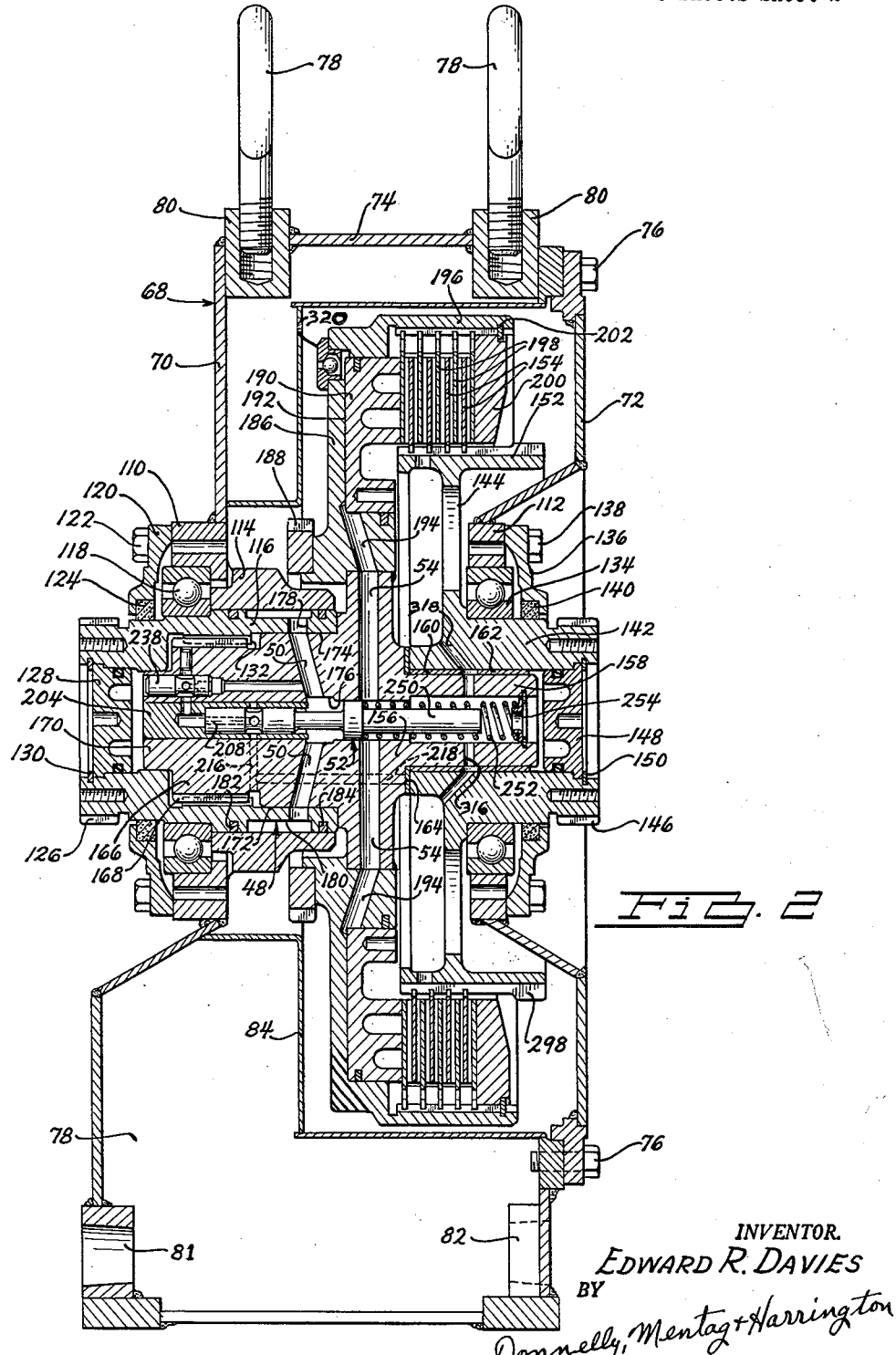
FIG. 2 is a longitudinal cross-sectional view of the clutch structure of FIG. 1 and is taken along the plane of section line 2—2 of FIG. 1.

For the purpose of more particularly describing the clutch mechanism referred to in the above discussion of the circuit diagram of FIG. 10, reference will be made to the other FIGURES 1 through 9. Referring first to FIGS. 1 and 2, numeral 68 generally identifies the clutch housing and it comprises a pair of end walls situated in juxtaposed relationship, as indicated at 70 and 72. A housing portion 74 surrounds the clutch mechanism and it cooperates with walls 70 and 72 to define a complete, hollow housing structure. Housing portion 74 may be secured to wall 70 by means of welding, as indicated, and the periphery of wall 72 may be secured to housing portion 74 by suitable fastening bolts 76.

If desired, suitable eyelets 78 may be threadably connected to bosses 80 formed in housing portion 74 to facilitate handling of the clutch mechanism. The lower region of the interior of clutch housing 68 serves as an oil sump and is identified by reference character 78. Fluid may be circulated through the sump by means of fluid inlet and outlet connections which may be respectively connected to fittings 81 and 82. The temperature of the sump oil may be controlled in this fashion.

The movable portion of the clutch mechanism may be semi-isolated from the sump region by means of a baffle structure 84. A breather pipe 86, which is illustrated in FIG. 1, provides aeration for the sump and a breather cap 88 of conventional construction may be used at the atmospheric end of the breather pipe.

The pair of control pumps 20 and 22 is secured to wall 70 as indicated in FIG. 1. These pumps were previously discussed with reference to the diagram of FIG. 10, and they will be subsequently more particularly described with reference to FIGS. 6 and 7. A relief valve and unloading valve housing is generally shown in FIG. 1 at 94 and it is secured in a suitable fashion to housing portion 74. These valves form a portion of the hydraulic control circuit as previously explained with reference to FIG. 10.

An oil filter screen is shown in FIG. 1 at 96, and it is situated within the sump 78. The filter 96 is connected to an end plate 98 which in turn is positioned over an opening formed in the lower section of housing portion 74, the body of filter 96 extending through this opening as indicated. A cover plate 100 is bolted over the end plate 98 and is secured in place by suitable bolts 102. A suitable gasket may be used between plates 98 and 100 if desired.

Cover plate 100 is formed with a recess 104 which provides communication between the interior of the body portion of filter 96, the ends of fluid inlet conduits 106 and 108 extending to pumps 20 and 22, respectively.

The walls 70 and 72 are each formed with axially aligned openings within which are fitted bearing supports 110 and 112, respectively. A hollow sleeve 114 is secured to bearing support 110 and it is adapted to receive therein a power input shaft 116. A ball bearing 118 is seated within bearing support 110 and it is adapted to rotatably journal power input shaft 116. A bearing retainer member 120 is bolted to bearing support 110 and the radially inward region thereof overlaps roller bearing 118 when it is secured in place by means of bolts 122. The bearing retained 120 also serves as a seal retainer within which a suitable fluid seal 124 is fitted, said seal 124 forming a sliding and sealing contact with power input shaft 116.

The end of power input shaft 116 is formed with external splines 126 which are adapted to form a driving connection with a suitable internally splined driving member which in turn may be powered by an engine such as a steam turbine or a marine diesel engine. Power input shaft 116 is formed with a hollow interior and the end thereof is closed by a suitable closure member 128 which may be held in place by a snap ring 130.

The intermediate portion of power input shaft 116 is formed with internal splines 132, the spline tooth spacing being substantially greater than the spline tooth thickness. This may best be observed in FIGS. 8 and 8a.

The bearing support 112 has positioned therein a ball bearing 134 and a bearing retainer member 136 may be bolted by means of bolts 138 to support 112 for the purpose of maintaining the bearing 134 in position. A fluid seal 140 may be positioned within retainer 136 as indicated. A hub 142 or a clutch member 144 is rotatably journalled in bearing 134 and seal 140 is disposed in sealing and sliding engagement with hub 142.

A hub 142 extends outwardly in a longitudinal direction and it functions as a power output member. External splines 146 are formed at the end of the power output member to facilitate a driving connection with a drive shaft extending to a power input pinion for a power transmission mechanism in a multiple power plant installation of the type previously described. The hub or power output shaft 142 is hollow and the hollow interior is closed by a closure member 148 which is held in place by a snap ring 150.

Clutch member 144 extends in a radially outward direction and it carries an externally splined peripheral portion 152 which in turn is adapted to carry internally splined clutch discs 154.

A clutch hub portion is generally identified by reference character 156 and it includes an axial extension 158 which is received within the opening formed in the hub of power output shaft 142. Extension 158 is journalled for rotation within power output shaft 142, and suitable bushings 160 and 162 are provided for this purpose. A radial thrust washer 164 is positioned, as indicated, to accommodate axial loads.

The clutch hub portion 156 further includes an extension 166 which is formed with external splines as shown at 168. This may best be seen by referring to FIGS. 8 and 8a. The spline teeth 168 have substantially less tooth thickness than the circumferential tooth spacing of the spline teeth 168, and they are adapted to be engaged with the internal spline teeth 132. It will be apparent from an inspection of FIGS. 8 and 8a that a substantial degree of rotary lost motion of clutch hub portion 156 with respect to power input shaft 116 may take place.

The end 170 of clutch hub portion 156 is formed with a reduced diameter and is piloted within a cooperating portion of the opening formed within power input shaft 116. An intermediate section 172 of clutch hub portion 156 is formed with a cylindrical valve surface and it slidably cooperates with an internal cylindrical valve surface 174 formed within the innermost end of power input shaft 116. Clutch hub portion 156 is further formed with an interior flow control valve chamber 176, and pressure passage 50, previously described with reference to the diagram of FIG. 10, communicates with the valve chamber 176 and extends to the valve surface 172. Power input shaft 116 is formed with a valve port 178, and when the clutch hub portion 156 assumes one angular position relative to power input shaft 116, port 178 becomes aligned with passage 50. Port 178 also communicates with an annular groove 180 formed in the outer surface of power input shaft 116. Suitable sealing rings may be situated in the outer surface of the power input shaft 116 at either side of the groove 180, as indicated at 182 and 184. The cavity defined in part by groove 180 communicates with passage 46 previously discussed with reference to FIG. 10, although the specific fluid flow path extending to passage 46 and the fluid fittings are not illustrated in FIG. 2.

The intermediate section of hub portion 156 extends radially outward and is joined to an annular clutch cylinder 186 in a suitable fashion, such as by welding. A pump drive ring gear 188 may be bolted or otherwise secured to the cylinder 186, as indicated.

An annular piston 190 is received within annular cylinder 186 and it cooperates therewith to define a clutch working chamber which is identified by reference character 192. A fluid pressure passage 194 is formed in clutch cylinder 186 and it extends in a generally radial direction to working chamber 192. The radially inward end of passage 194 communicates with the aforementioned passage 54 which is formed in hub portion 156 and which extends in a radial direction as indicated. The radially inward end of passage 54 communicates with valve chamber 176. If desired, two or more of each of the passages 50, 54 and 194 may be provided as indicated in FIG. 2.

Clutch cylinder 186 is formed with an internally splined peripheral portion 196 which is adapted to carry a plurality of externally splined clutch discs 198. An externally splined clutch plate backup member 200 is also carried by internally splined peripheral portion 196, and it is retained in place by a suitable snap ring 202.

Annular piston 190 is adapted to move in a right hand direction, as viewed in FIG. 2, when fluid pressure is admitted into working chamber 192. When this occurs, clutch discs 154 and 198 become frictionally engaged thereby establishing a driving connection between clutch hub portion 156 and clutch member 144. Valve chamber 176 has received therein a valve insert identified by reference character 204. One end of the insert 204 is formed with a hollow bore 206 within which a pair of valve lands 208 and 210 is slidably received, said valve lands forming a pair of flow control valve spools generally identified by reference character 212. A valve port 214 is formed in the wall of valve insert 204 and it provides communication between the inner bore 206 and a radial exhaust passage 216, the latter extending radially outward into the region of splines 168 and 132. A longitudinal exhaust passage 218 is also formed in clutch hub portion 156 and it communicates with passage 216 at one end thereof. The other end of passage 218 extends to the interior of clutch hub portion 146 in the region of thrust washer 164. Radial grooves are formed in thrust washer 164 to provide free communication between passage 218 and the clutch sump.

Valve spool 212 is also formed with an internal longitudinal fluid passage 220 which communicates with the inner end of bore 206 and with a radial passage 228 formed in valve insert 204 as indicated. Radial passage 208 in turn communicates with a fluid passage 230 formed in the extension 166 of clutch hub portion 156. The radially outward end of passage 230 is closed by a plug 232 retained in place by means of a force fit. The provision of such a radial through passage and the plug 232 facilitates a conventional drilling operation during manufacture.

Extension 166 of clutch hub portion 156 is also formed with a longitudinally extending passage 234 which communicates at one end thereof with the aforementioned passage 50. The other end of passage 234 communicates with an enlarged diameter bore 236. A cylindrical insert 238 is received within bore 236 and is held in place by means of a press fit or by any other suitable retaining means. Insert 238 is formed with a longitudinally extending passage 240 which is defined in part by a fluid flow restriction and which communicates with a radial port 242. An annular groove 244 is formed in insert 238 and it defines an annular cavity which communicates with port 242 and with passage 230. Passage 240 in insert 238 extends from the right hand side of insert 238 as viewed in FIG. 2 and it communicates with passage 234.

Valve spool 212 is formed with another valve land 246 having a diameter substantially greater than the diameter of valve lands 208 and 210, and it is slidably received within an internal valve land 248 formed within valve cavity 176. Passage 54 in clutch hub portion 156 communicates with the interior of valve chamber 176 through valve land 248.

Figure 9:
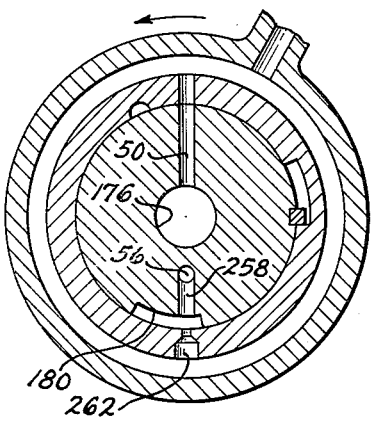
FIG. 9 is another schematic cross-sectional view taken along section line 8—8 of FIG. 4. This view shows lubricating oil passages in relatively movable portions of the clutch, said relatively movable portions being shown in the position they assume when the clutch is engaged.
Figure 9A:
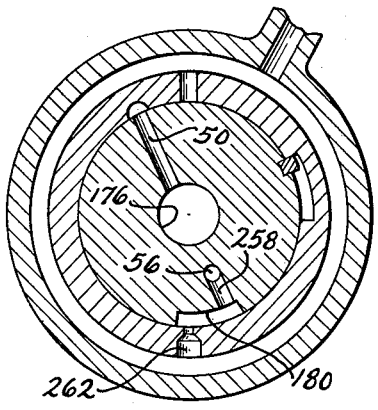
FIG. 9a is a view similar to that of FIG. 9 although the relatively movable portions illustrated in FIG. 9a are illustrated in the position they assume when the clutch is disengaged.

Valve spool 212 also includes a valve stem 250 about which is positioned a valve compression spring 252, one end of spring 252 being seated on valve land 246. A spring seat element 254 is disposed within the interior opening of extension 158 of hub portion 156 and is held in place by a suitable snap ring as indicated. The other end of spring 252 is seated on element 254 so that valve spool 212 is normally urged in a left hand direction as viewed in FIG. 2. The lubricating oil passage 56 referred to with reference to FIG. 10 is best seen in FIG. 3, and it extends in a longitudinal direction in extension 158 of clutch hub portion 156. One end of passage 56 is closed by a plug 256 which may be press fitted into the passage as indicated. The other end of passage 56 communicates with a passage 258 extending in a generally radial direction to an arcuate recess 260 formed in valve surface 172. As best seen in FIGS. 9 and 9a, the space defined by recess 260 communicates with the space defined by groove 180 through a flow restricting orifice 262. Referring again to FIG. 3, passage 56 is adapted to distribute lubricating oil to bushings 160 and 162 through transversely extending oil passages 264 and 266.

It will be apparent from an inspection of FIGS. 9 and 9a that orifice 262 will provide continuous communication between recess 260 and the space defined by groove 180 regardless of the relative angular positions of clutch hub member 156 with respect to power input shaft 116.

Figure 6:
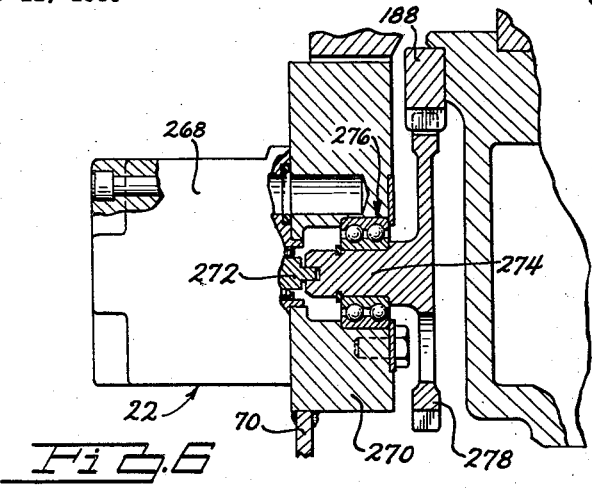
FIG. 6 is a sub-assembly view, partly in section, of one of the two fluid pressure pumps for supplying control pressure to the clutch circuit, together with an illustration of the pump drive means.

Referring next to FIG. 6, the control pressure pump 22 is shown in more particular detail and it includes a pump housing 268 which may be secured to a supporting boss 270 which in turn is connected to wall 70 of the clutch housing. The pump armature shaft 272 is formed with a tongue which engages a mating groove formed in drive shaft 274, the latter in turn being journalled within boss 270 by means of a bearing generally identified by reference character 276. A pump drive gear 278 is carried by shaft 274 and it in turn is adapted to drivably engage the aforementioned ring gear 188 carried by clutch cylinder 186. It is therefore apparent that pump 22 will be driven whenever the power input shaft 116 is driven and control pressure will be made available to the control circuit.

Figure 7:
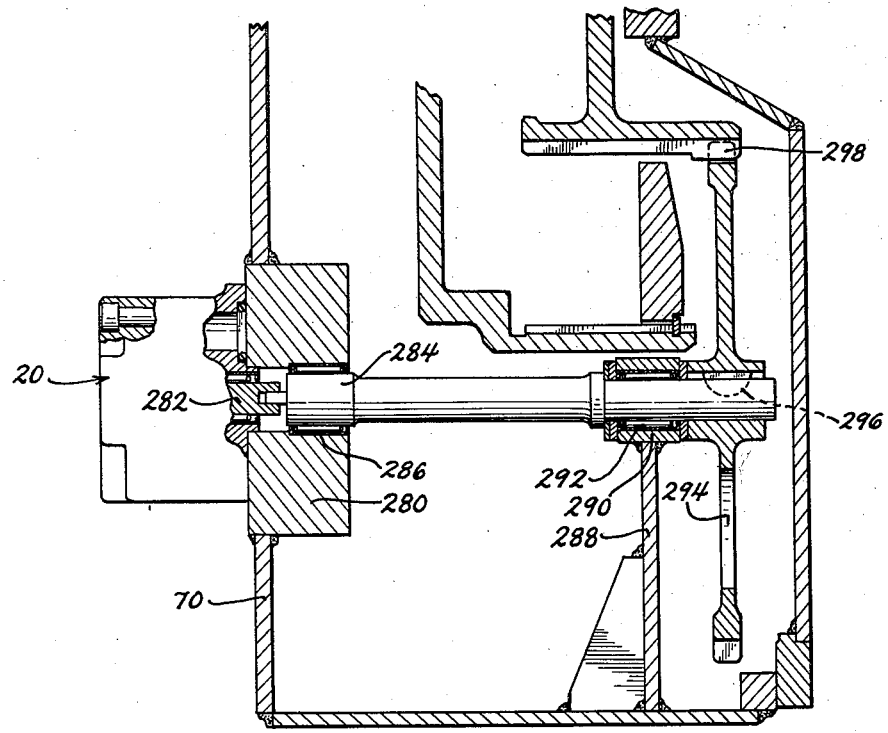
FIG. 7 is a sub-assembly view of a second control pressure pump for the clutch circuit together with a partial showing of the pump drive means.

Referring next to FIG. 7, I have shown in more particular detail the pump 20. This pump is secured to a boss 280 which in turn is secured in a suitable fashion, such as by welding, to an aperture in the wall 70 of the clutch housing. The end of armature shaft 282 of pump 20 is formed with a groove which is adapted to engage a tongue formed on the end of a pump drive shaft 284, one end of the latter being journalled with boss 280 by means of needle bearing 286.

A bearing support 288 is formed within the clutch housing and the other end of the drive shaft 284 is rotatably journalled within a bearing retainer 290 carried by support 288, suitable needle bearings 292 being provided for this purpose. A drive gear 294 is carried by shaft 284 adjacent the bearing support 288 and a driving connection therebetween is provided by a suitable key and slot connection 296. Gear 294 drivably engages a ring gear element 298 carried by the periphery of clutch member 144 which in turn is carried by the power output shaft 142 as previously indicated. It is therefore apparent from the foregoing that pump 20 will be driven whenever the power output shaft 142 is driven, and lubricating oil pressure will always be made available even when the power input driven pump 22 is inoperative.

Figure 5:
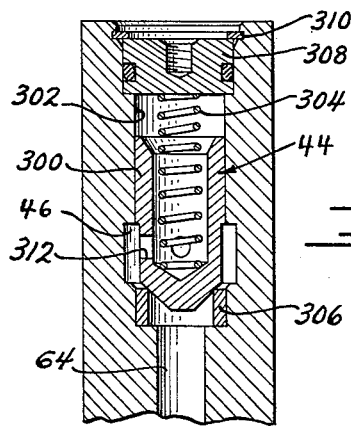
FIG. 5 is a partial cross-sectional view of a relief valve which forms a portion of the clutch control circuit, and is taken along the plane of section line 5—5 of FIG. 1.

Referring next to FIG. 5, I have illustrated in more particular detail a one-way check valve 44 which was previously discussed with reference to FIG. 10. This valve is one of the two one way check valves, shown at 30 and 44 in FIG. 10, which prevents oil leakage through one pump when the other pump is operating. Valve 44 comprises a valve element 300 which is slidably received within a valve bore 302 and urged in a downward direction, as viewed in FIG. 5 by means of the valve spring 304. A valve seat 306 surrounds the end of the aforementioned passage 64 and valve element 300 engages the same under the influence of spring pressure. Valve chamber 302 is closed by a closure member 308 which may be held in place by snap ring 310, said closure member also functioning as a seat for spring 304. The aforementioned control passage 46 is defined in part by an annular groove surrounding valve element 300, and the chamber defined by closure member 308 and valve element 300 communicates with this annular groove through radial ports 312 so that the fluid discharged by the valve 300 when it is moved in the valve chamber may pass freely into the control passage.

When the control circuit pressure exceeds an established value such as 125 p.s.i., valve 60, FIG. 10, will become unseated thereby permitting fluid to bypass directly into the sump region through passage 62, thereby relieving the circuit pressure and establishing a maximum controlled value for the same.

Figure 4:
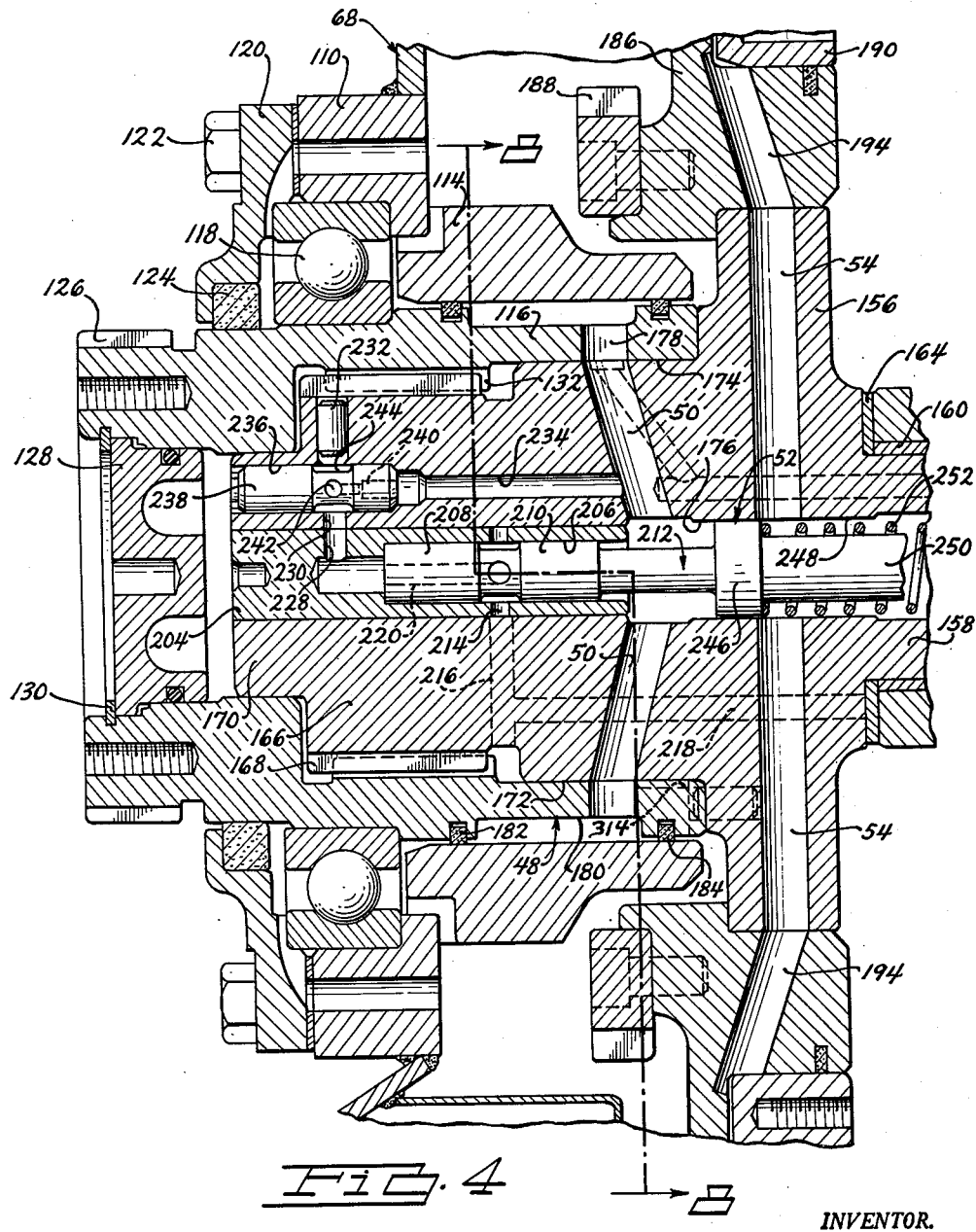
FIG. 4 is an enlarged view of those portions of the structure shown in FIG. 2 which are situated relatively close to the axis of rotation of the clutch.

As best seen in FIG. 4, the right hand end of power input shaft 116 is formed with an axially extending recess 314, and it extends to a location adjacent one of the ports 178. Recess 314 forms an exhaust passage extending from the region of ports 178 to a sump region of the clutch housing, the right hand end of shaft 116 being formed with a radial groove for this purpose.

In FIG. 2, I have generally designated by reference character 320 an exhaust valve for eliminating centrifugal pressure from the annular working chamber 192. Valve 320 includes a ball valve element cooperating with an axial vent passage and it is seated on a tapered valve seat. When working chamber 192 is pressurized, the ball valve element is seated against the valve seat to close the vent passage. However, when the working pressure is relieved from working chamber 192, the valve element is moved radially outward under the influence of centrifugal force thereby allowing the residual fluid in the working chamber to become vented, thus preventing an undesirable centrifugal pressure buildup.

Figure 8:
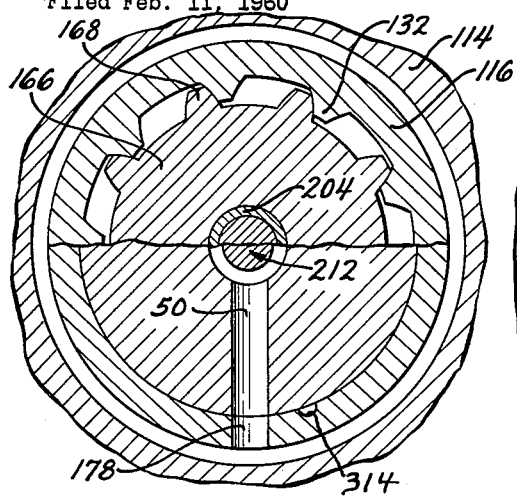
FIG. 8 is a schematic cross-sectional view of the internal view of the internal valve mechanism of the clutch control circuit and is taken along the plane of section line 8—8 of FIG. 4. The valve as illustrated in FIG. 8 is conditioned for clutch engagement.
Figure 8A:
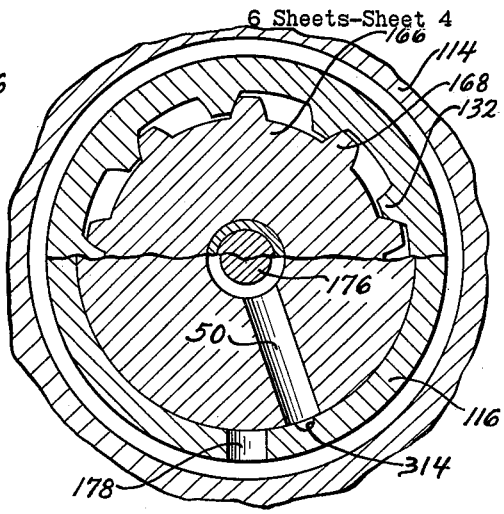
FIG. 8a is a schematic cross-sectional view similar to the view of FIG. 8 and it shows the valve mechanism in a clutch disengaging condition.

When the turbine engine connected to power input shaft 116 is inoperative or is malfunctioning, splines 132 and 168 permit movement of the power input shaft 116 relative to clutch hub extension 166 to the position shown in FIG. 8a, and one of the passages 50 will become aligned with exhaust recess 314. If desired, two or more such exhaust recesses 314 may be provided. The exhaust recess 314 will therefore cause fluid pressure to be exhausted from valve chamber 176, passages 54 and clutch working chamber 192 thereby causing the clutch to disengage.

Valve lands 210 and 246 on valve spool 212 are formed with differential diameters so that fluid pressure which exists in the valve chamber 176 between valve land 210 and 246 will cause valve spool 212 to move in a right hand direction against the opposing force of spring 252. If it is assumed that valve spool 212 is moved in a right hand direction, as viewed in FIGS. 2 and 4, just prior to the disengagement of the clutch, fluid pressure will be exhausted directly from the clutch working chamber and passages 54 to passages 50 through the valve chamber 176. As the pressure decreases, valve land 246 covers passages 54 and interrupts communication between passages 54 and passages 50. The residual fluid pressure in the clutch working chamber and in passages 54 must be exhausted through the right hand end of the valve chamber which is occupied by the spring. This portion of the valve chamber communicates with the exhaust region through radial passages 316 formed in hub extension 158, and passages 318 complete the exhaust flow path.

When the clutch has been disengaged in this fashion, the lubrication pump, which is drivably connected to gear 298, continues to supply the circuit with the necessary lubrication pressure. As previously explained with reference to FIGS. 9 and 9a, the passages 258 and 56 are provided with lubricating pressure regardless of the relative positions of power input shaft 116 with respect to hub extension 172.

When it is desired to again connect the inoperative engine to the power flow path, the engine is accelerated, and when the power input shaft 116 becomes synchronized with the speed of rotation of power output hub 142, the lost motion spline connection will assume the position shown in FIG. 8, thereby causing ports 178 to become aligned with passages 50. However, valve spool 52 at this instant will assume the position shown in FIGS. 2 and 4, and fluid pressure will therefore not be immediately distributed to passages 54 or to the clutch working chamber. However, fluid pressure is distributed from the groove 180, through passages 50, through passage 234 and through the orifice in insert 238 to passage 228. Fluid is then circulated through the interior of valve insert 204 and through passage 220 formed in valve spool 212. The passage 200 communicates through an opening formed in valve spool 212 between lands 208 and 210 with a part 214 and with passages 216 and 218.

The fluid pressure in passages 50 creates a valve biasing force which acts in a right hand direction as previously explained, and when the pressure exceeds a predetermined value, such as 75 p.s.i., valve land 246 uncovers passages 54 thereby allowing the clutch working chamber to become pressurized. Simultaneously with the uncovering of passages 54, valve land 208 blocks port 214 thereby interrupting the previously described exhaust flow path. The orifice in insert 238 is calibrated so that the pressure drop thereacross will establish an unbalanced pressure force on valve spool 212 of sufficient magnitude so that the above valving action will occur at the desired control pressure. In this way the clutch will not be subjected to excess drag by reason of partial engagement during the acceleration period of the turbine or engine.

Having thus described the principal features of a preferred embodiment of my invention, what I claim and desire to secure by U.S. Letters Patent is:

1. A fluid pressure operated clutch comprising a power input member, a power output member, an intermediate member, engageable friction clutch elements connected to said intermediate member and said power output member, servo means carried by said intermediate member for energizing said clutch elements, conduit structure for distributing fluid pressure to said servo means, a fluid pressure source, torque responsive valve means including cooperating valve elements carried by said power input member and said intermediate member for establishing communication between said pressure source and said conduit structure when said power input member is connected to a source of driving power and for interrupting the same when said power input member is disconnected from said source of driving power, and flow control valve means defined in part by said conduit structure for blocking pressure distribution to said servo means when the operating pressure level is lower than a pre-calibrated value, said flow control valve means comprising a bypass fluid flow passage interconnecting said conduit structure with an exhaust region, said bypass passage including a fluid flow restriction adapted to create a pressure differential thereacross, said pressure differential acting on said flow control valve means for actuating the same.

2. A fluid pressure operated clutch comprising a power input member, a power output member, an intermediate member, bearing means for rotatably journaling said members for coaxial rotation, engageable friction clutch elements carried by said intermediate member and by said output member, servo means defined in part by said intermediate member for frictionally engaging said clutch elements, a lost motion connection between said power input member and said intermediate member, passage structure in said intermediate member communicating with said servo means, a fluid pressure source, torque responsive valve means including relatively movable, cooperating valve elements carried by said power input member and said intermediate member for establishing communication between said conduit structure and said pressure source when said power input member is connected to a source of driving power and for interrupting communication therebetween when said power input member is disconnected from said driving power source, a bypass exhaust passage in said intermediate member communicating with said passage structure including a flow restricting orifice therein, and flow control valve means in said intermediate member including a portion defining in part said conduit structure and another portion defining in part said exhaust passage for regulating the distribution of fluid pressure to said servo means, said flow control valve means being responsive to the pressure differential across said orifice and establishing free communication between said exhaust passage and an exhaust region and blocking said conduit structure when the pressure differential across said orifice is less than a calibrated value, said flow control valve means blocking said exhaust passage and opening said conduit structure when the pressure differential across said orifice exceeds said calibrated value.

3. A fluid pressure operated clutch comprising a power input member, a power output member, an intermediate member, friction clutch elements carried by said intermediate member and said power output member, servo means carried by said intermediate member for energizing said clutch elements, a lost motion connection between said power input member and said intermediate member, a valve chamber in said intermediate chamber, a valve spool movably disposed in said valve chamber, said valve spool having two adjacent valve lands of differential diameter, first passage structure interconnecting said servo means and one part of said valve chamber, a source of fluid pressure, second passage structure extending from another part of said valve chamber to said pressure source, torque responsive valve means including cooperating valve elements connected to said power input member and said intermediate member for alternately opening and blocking said second passage structure as determined by the direction of torque delivery through said lost motion connection, the pressure in said second passage structure acting on said valve lands thereby biasing said valve spool in one direction, and spring means for biasing said valve spool in the opposite direction, said valve spool interrupting communication between said first and second passage structures upon movement thereof in said opposite direction.

4. A fluid pressure operated clutch comprising a power input member, a power output member, an intermediate member, friction clutch elements carried by said intermediate member and said power output member, servo means carried by said intermediate member for energizing said clutch elements, a lost motion connection between said power input member and said intermediate member, a valve chamber in said intermediate member, a valve spool movably disposed in said valve chamber, said valve spool having two adjacent valve lands of differential diameter, first passage structure interconnecting said servo means and one part of said valve chamber, a source of fluid pressure, second passage structure extending from another part of said valve chamber to said pressure source, torque responsive valve means including cooperating valve elements connected to said power input member and said intermediate member for alternately opening and blocking said second passage structure as determined by the direction of torque delivery through said lost motion connection, a bypass exhaust passage in said intermediate member communicating with said second passage structure, said exhaust passage being defined in part by said valve chamber, the pressure in said second passage structure acting on said valve lands thereby biasing said valve spool in one direction, and spring means for biasing said valve spool in the opposite direction, said valve spool interrupting communication between said first and second passage structures and opening said bypass exhaust passage upon movement thereof in said opposite direction, movement of said valve spool in said one direction causing said valve spool to close said bypass exhaust passage and to establish communication between said first and second passage structures.

5. A fluid pressure operated clutch comprising a power input member, a power output member, an intermediate member, friction clutch elements carried by said intermediate member and said power output member, servo means carried by said intermediate member for energizing said clutch elements, a lost motion connection between said power input member and said intermediate member, a valve chamber in said intermediate member, a valve spool movably disposed in said valve chamber, said valve spool having two adjacent valve lands of differential diameter, first passage structure interconnecting said servo means and one part of said valve chamber, a source of fluid pressure, second passage structure extending from another part of said valve chamber to said pressure source, torque responsive valve means including cooperating valve elements connected to said power input member and said intermediate member for alternately opening and blocking said second passage structure as determined by the direction of torque delivery through said lost motion connection, the pressure in said second passage structure acting on said valve lands thereby biasing said valve spool in one direction, spring means for biasing said valve spool in the opposite direction, said valve spool interrupting communication between said first and second passage structures upon movement thereof in said opposite direction, said pressure source comprising a first fluid pressure pump drivably connected to said power input member and a second fluid pressure pump drivably connected to said power output member, and a common pressure delivery conduit interconnecting said pumps and said torque responsive valve, each pump including a one-way check valve between said common conduit and the discharge side of the pump.

6. A fluid pressure operated clutch comprising a power input member, a power output member, an intermediate member, friction clutch elements, carried by said intermediate member and said power output member, servo means carried by said intermediate member for energizing said clutch elements, a lost motion connection between said power input member and said intermediate member, a valve chamber in said intermediate member, a valve spool movably disposed in said valve chamber, said valve spool having two adjacent valve lands of differential diameter, first passage structure interconnecting said servo means and one part of said valve chamber, a source of fluid pressure, second passage structure extending from another part of said valve chamber to said pressure source, torque responsive valve means including cooperating valve elements connected to said power input member and said intermediate member for alternately opening and blocking said second passage structure as determined by the direction of torque delivery through said lost motion connection, a bypass exhaust passage in said intermediate member communicating with said second passage structure, said exhaust passage being defined in part by said valve chamber, the pressure in said second passage structure acting on said valve lands thereby biasing said valve spool in one direction, spring means for biasing said valve spool in the opposite direction, said valve spool interrupting communication between said first and second passage structures and opening said bypass exhaust passage upon movement thereof in said opposite direction, movement of said valve spool in said one direction causing said valve spool to close said bypass exhaust passage and to establish communication between said first and second passage structures, said pressure source comprising a first fluid pressure pump drivably connected to said power input member and a second fluid pressure pump drivably connected to said power output member, and a common pressure delivery conduit interconnecting said pumps and said torque responsive valve, each pump including a one-way check valve between said common conduit and the discharge side thereof.

7. A fluid pressure operated clutch comprising a power input member, a power output member, an intermediate member, engageable friction elements carried by said intermediate member and said power output member, fluid pressure operated servo means for energizing said friction elements, said intermediate member forming a part of said servo means, rotary valve means defined in part by said power input member and said intermediate member including a lost motion connection between said power input member and said intermediate member, said valve means including cooperating valve lands defined by said power input member and by said intermediate member, a fluid pressure source, conduit structure in said intermediate member defined in part by said valve means, said conduit structure interconnecting said pressure source and said servo means, an exhaust passage intersecting said conduit structure, and flow control valve means including valve parts disposed in and partly defining said conduit structure and said exhaust passage for blocking said conduit structure and opening said exhaust passage when the fluid pressure in said conduit structure is less than a predetermined value and for opening said conduit structure and blocking said exhaust passage when the fluid pressure in said conduit structure is greater than a predetermined value, said lost motion connection accommodating movement of said valve lands to a conduit structure closing position when said power input member and said intermediate member assume one relative position and assuming an open conduit structure position when said power input member and said intermediate member assume another relative position.

8. A fluid pressure operated clutch comprising a power input member, a power output member, an intermediate member, engageable friction elements carried by said intermediate member and said power output member, fluid pressure operated servo means for energizing said friction elements, said intermediate member forming a part of said servo means, rotary valve means defined in part by said power input member and said intermediate member including a lost motion connection between said power input member and said intermediate member, said valve means including cooperating valve lands defined by said power input member and by said intermediate member, a fluid pressure source, conduit structure in said intermediate member defined in part by said valve means, said conduit structure interconnecting said pressure source and said servo means, an exhaust passage intersecting said conduit structure, and flow control valve means including valve parts disposed in and partly defining said conduit structure and said exhaust passage for blocking said conduit structure and opening said exhaust passage when the fluid pressure in said conduit structure is less than a predetermined value and for opening said conduit structure and blocking said exhaust passage when the fluid pressure in said conduit structure is greater than a predetermined value, said lost motion connection accommodating movement of said valve lands to a conduit structure closing position when said power input member and said intermediate member assume one relative position and assuming an open conduit structure position when said power input member and said intermediate member assume another relative position, said flow control valve means comprising a movable valve spool, and said exhaust passage comprising a fluid flow restriction, the pressure differential across said restriction acting on said valve spool to create a valve spool biasing force.

References Cited in the file of this patent
UNITED STATES PATENTS

| | | |
|---|---|---|
| 2,476,632 | Shaff | July 19, 1946 |
| 2,564,281 | Rockwell | Aug. 14, 1951 |
| 2,646,150 | Hobbs | July 21, 1953 |
| 2,715,455 | Miller | Aug. 16, 1955 |
| 2,739,679 | Randol | Mar. 27, 1956 |
| 2,740,512 | Fisher | Apr. 3, 1956 |
| 2,766,864 | Schilling et al. | Oct. 16, 1956 |
| 2,865,481 | De Teramala | Dec. 23, 1958 |
| 2,945,574 | Plume | July 15, 1960 |
| 2,946,241 | Snyder | July 26, 1960 |
| 2,960,202 | Stevens et al. | Nov. 15, 1960 |
| 2,979,176 | Voth | Apr. 11, 1961 |

FOREIGN PATENTS

| | | |
|---|---|---|
| 762,947 | Great Britain | Dec. 5, 1956 |